United States Patent
Matsumoto

(10) Patent No.: US 9,822,991 B2
(45) Date of Patent: Nov. 21, 2017

(54) AIR-CONDITIONING APPARATUS SUPPORT SYSTEM

(71) Applicant: Mitsubishi Electric Corporation, Tokyo (JP)

(72) Inventor: Takashi Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 14/651,082

(22) PCT Filed: Feb. 13, 2014

(86) PCT No.: PCT/JP2014/053289
§ 371 (c)(1),
(2) Date: Jun. 10, 2015

(87) PCT Pub. No.: WO2014/141803
PCT Pub. Date: Sep. 18, 2014

(65) Prior Publication Data
US 2015/0330646 A1    Nov. 19, 2015

(30) Foreign Application Priority Data
Mar. 12, 2013   (JP) ................................. 2013-049283

(51) Int. Cl.
*F24F 11/00* (2006.01)
*G05B 15/02* (2006.01)

(52) U.S. Cl.
CPC ............ *F24F 11/006* (2013.01); *G05B 15/02* (2013.01); *F24F 2011/0052* (2013.01);
(Continued)

(58) Field of Classification Search
CPC ............ F24F 11/006; F24F 2011/0052; F24F 2011/0071; G05B 15/02;
(Continued)

(56) References Cited

U.S. PATENT DOCUMENTS 6,199,390 B1 *   3/2001   Mukohara ............ F24F 11/0086
                                                        236/94
9,020,432 B2 *   4/2015   Matsushita ....... H04L 12/40013
                                                        455/41.1
(Continued)

FOREIGN PATENT DOCUMENTS

JP    2000-081242 A    3/2000
JP    2002-089874 A    3/2002
(Continued)

OTHER PUBLICATIONS

Machine translation of JP2005150901, Furui Akiko, Appliance registration system and information terminal, Jun. 9, 2005, 12 pages.*

(Continued)

*Primary Examiner* — Sean Shechtman
*Assistant Examiner* — Tri T Nguyen
(74) *Attorney, Agent, or Firm* — Posz Law Group, PLC

(57) ABSTRACT

An air-conditioning apparatus support system has a smartphone including a GPS, a camera, a communication unit that communicates with a center computer, a screen, and a control unit. When the control unit is activated at a location at which the air-conditioning apparatus is installed, the control unit executes a step of assuming a location detected by the GPS to be the location at which the air-conditioning apparatus is installed and causing the center computer to register the location, and, after registration has been made, when the control unit is activated at the location at which the air-conditioning apparatus is installed, in the case where the air-conditioning apparatus is registered in the center computer, the control unit causes the screen to display information about the air-conditioning apparatus.

14 Claims, 13 Drawing Sheets

(52) U.S. Cl.
CPC ............... *F24F 2011/0071* (2013.01); *G05B 2219/24048* (2013.01); *G05B 2219/25167* (2013.01); *G05B 2219/25168* (2013.01); *G05B 2219/2614* (2013.01); *G05B 2219/2638* (2013.01)

(58) Field of Classification Search
CPC ........... G05B 2219/24048; G05B 2219/25167; G05B 2219/25168; G05B 2219/2614; G05B 2219/2638
See application file for complete search history.

(56) References Cited

U.S. PATENT DOCUMENTS

| | | | | |
|---|---|---|---|---|
| 2010/0274403 | A1* | 10/2010 | Maeda | H02J 3/14 700/291 |
| 2010/0325580 | A1* | 12/2010 | Horiuchi | F24F 11/0086 715/810 |
| 2012/0158189 | A1* | 6/2012 | Cho | F24F 11/006 700/276 |
| 2013/0195367 | A1* | 8/2013 | Ohira | G06K 9/228 382/206 |
| 2014/0189563 | A1* | 7/2014 | Kim | G08B 21/245 715/771 |

FOREIGN PATENT DOCUMENTS

| | | |
|---|---|---|
| JP | 2006-195765 A | 7/2006 |
| JP | 2007-233619 A | 9/2007 |
| JP | 2009-014233 A | 1/2009 |
| JP | 2009-257754 A | 11/2009 |
| JP | 2013-029302 A | 2/2013 |
| WO | 2011/154906 A1 | 12/2011 |

OTHER PUBLICATIONS

Extended European Search Report dated Sep. 19, 2016 issued in corresponding EP patent application No. 14763384.6.
International Search Report of the International Searching Authority dated Apr. 8, 2014 for the corresponding international application No. PCT/JP2014/053289 (and English translation).
Office Action dated Jun. 13, 2017 issued in corresponding JP patent application No. 2016-147698 (and English translation).

* cited by examiner

AIR-CONDITIONING APPARATUS SUPPORT SYSTEM

CROSS REFERENCE TO RELATED APPLICATIONS

This application is a U.S. national stage application of International Patent Application No. PCT/JP2014/053289, filed on Feb. 13, 2014, which is based on Japanese Patent Application No. 2013-049283, filed on Mar. 12, 2013, the content of which is incorporated herein by reference.

TECHNICAL FIELD

The present invention relates to an air-conditioning apparatus support system, and more particularly, to an air-conditioning apparatus support system having a multifunctional mobile communication device (smartphone).

BACKGROUND

There have hitherto been many cases in which a user wonders, "Is it a failure?" when a state different from usual operation is encountered or when a display not usually seen is presented on a main body during operation of an air-conditioning apparatus. In such cases, the user cannot immediately determine "whether it is a failure or whether it is not a failure but a normal operating state". This causes the user to make a determination while reading an "instruction manual" that describes how to use the air-conditioning apparatus or an "HP (website on the Internet)", on which time and effort are spent. Furthermore, the case where the instruction manual has been lost or the case where the HP cannot be accessed makes it difficult to perform immediate checking.

It is noted that, among various behaviors or states that cause the user to wonder, "Is it a failure?" in the air-conditioning apparatus, there are the case where the air conditioner actually suffers a failure and stops operating or behaves abnormally, and the case where, although the air conditioner seems to behave abnormally, this is not a failure but a normal behavior (situation). Furthermore, even when the air conditioner suffers a failure, there are the case where the user can repair the failure by himself/herself and the case where the user cannot repair the failure.

Hence, there have been requests that the user be able to know (determine) "what" the current situation is like.

Thus, there has been disclosed a voice notification device of an air-conditioning apparatus that is capable of providing a notification of information about the air-conditioning apparatus state such as an abnormal state, a self-diagnosis result, and an operating state of the air-conditioning apparatus by means of voice (for example, see Patent Literature 1).

PATENT LITERATURE

Patent Literature 1: Japanese Unexamined Patent Application Publication No. 2000-81242 (pages 9 to 11, FIG. 3)

However, the voice notification device of the air-conditioning apparatus disclosed in Patent Literature 1 has the following problems.

(a) When an error check command is received from a remote control, in the case where no error flag is stored in a control unit, only a voice saying "No abnormality" is output. Thus, although the user has issued the error check command to resolve doubts or concerns because a state that is rarely encountered during daily operation occurred, the doubts or concerns are not eventually resolved even when the user understands that there is no abnormality.

(b) In particular, although the user has issued the error check command from the remote control because a state that is rarely encountered during daily operation occurred, the user cannot specify, with the remote control, information (parts, states, and the like) about which the user has doubts or concerns. Thus, the user will be concerned about whether or not an abnormality has been checked for the information that the user wants to know, thereby undermining the credibility of the voice notification device.

SUMMARY

The present invention has been accomplished to solve the above-described problems, and provides an air-conditioning apparatus support system that is capable of notifying a user of information about the state of an air-conditioning apparatus easily and quickly without time and effort spent for the information.

An air-conditioning apparatus support system according to the present invention is an air-conditioning apparatus support system that supports an air-conditioning apparatus via a multifunctional mobile communication device connected to the Internet. The multifunctional mobile communication device includes: a global positioning system that detects a location of the multifunctional mobile communication device; an image capturing unit that captures an image of surroundings; a communication unit that communicates with a center computer connected to the Internet; a display unit that displays a character and an image; and a control unit configured to receive input of information of the location detected by the global positioning system and control the image capturing unit, the communication unit, and the display unit. When the control unit of the multifunctional mobile communication device is activated at a location at which the air-conditioning apparatus is installed, in a case where the air-conditioning apparatus is not registered in the center computer, the control unit executes a step of assuming the location detected by the global positioning system to be the location at which the air-conditioning apparatus is installed and causing the center computer to register the location, and, when the control unit is activated at the location at which the air-conditioning apparatus is installed, in a case where the air-conditioning apparatus is registered in the center computer, the control unit causes the display unit to display information about the air-conditioning apparatus.

In the air-conditioning apparatus support system according to the present invention, because the assumed location of the air-conditioning apparatus is registered in the center computer when the control unit is activated in the multifunctional mobile communication device including the global positioning system (GPS), once the location of the air-conditioning apparatus has been registered, the model (type) of the air-conditioning apparatus is identified by only activating the control unit at the location of the air-conditioning apparatus. Hence, this can save time and effort spent on, for example, inputting a model name, or taking an image of the air-conditioning apparatus or identification provided on the air-conditioning apparatus to identify the model of the air-conditioning apparatus each time when information about the air-conditioning apparatus is desired to be known, thereby increasing convenience.

It is noted that the location at which the air-conditioning apparatus is installed is a region including the location of a wall or ceiling on which an indoor unit of the air-conditioning apparatus is actually installed. Examples of the location include a room in which the indoor unit of the air-conditioning apparatus is installed, and a balcony or a corner of a garden in which an outdoor unit of the air-conditioning apparatus is actually installed (for example, a region within 3 m from the outdoor unit). Furthermore, activation of the control unit performed to register the location of the air-conditioning apparatus in the center computer is not limited to the time after the air-conditioning apparatus is actually installed, and, for example, the activation may be performed in a room in which the air-conditioning apparatus is to be installed before it is actually installed.

DETAILED DESCRIPTION

Embodiment 1

Figure 1:
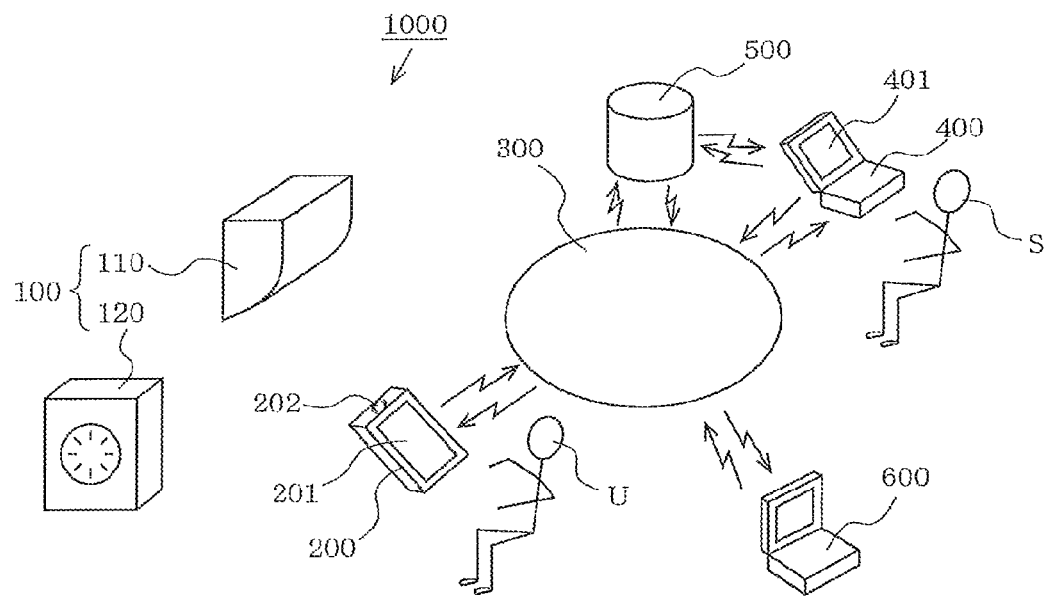
FIG. 1 is a configuration diagram schematically illustrating an air-conditioning apparatus support system and its surroundings according to Embodiment 1 of the present invention.
Figure 2:
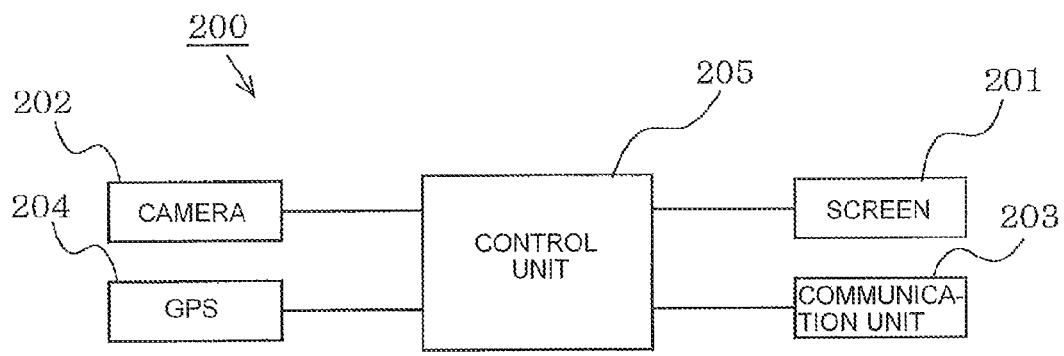
FIG. 2 is a configuration diagram illustrating a configuration of a component (multifunctional mobile communication device) of the air-conditioning apparatus support system illustrated in FIG. 1.

FIGS. 1 to 6 are diagrams for describing an air-conditioning apparatus support system according to Embodiment 1 of the present invention, FIG. 1 is a configuration diagram schematically illustrating the air-conditioning apparatus support system and its surroundings, FIG. 2 is a configuration diagram illustrating a configuration of a component (multifunctional mobile communication device) of the air-conditioning apparatus support system, and FIGS. 3 to 6 are each a flowchart illustrating a flow of control performed by a multifunctional mobile communication device control unit included in the component of the air-conditioning apparatus support system.

(Air-Conditioning Apparatus Support System)

In FIG. 1, an air-conditioning apparatus support system (hereinafter referred to as "support system") 1000 includes an air-conditioning apparatus 100 (hereinafter, it may be referred to as "air conditioner") including an indoor unit 110 (see FIG. 7, etc.) and an outdoor unit 120, and a multifunctional mobile communication device (hereinafter referred to as "smartphone 200") used by a user U.

(Smartphone)

Then, the smartphone 200 communicates about information on the air-conditioning apparatus 100 with a terminal (center computer, hereinafter referred to as "center PC") 400 that is connected to the Internet 300 (via a wireless or wired connection) and is placed in a support center, a server 500 that is connected to the center PC 400 directly or via the Internet 300, and a terminal (local computer, hereinafter referred to as "local PC") 600 that is connected to the Internet 300 (via a wireless or wired connection) and is placed in a local service center or a shop (hereinafter, the local service center and the shop are collectively referred to as "service center").

For the sake of simplicity, it is noted that the center PC 400 and the server 500 may be collectively referred to as the center PC 400. Furthermore, in some cases, there is no local PC 600.

In FIG. 2, the smartphone 200 includes a screen (identical to a display unit) 201 that displays a character and an image, a camera (image capturing unit) 202 that captures an image of the surroundings, a communication unit 203 that communicates with the center PC 400 connected to the Internet 300, a GPS 204 that detects a location of the smartphone 200 (a location on the ground or on a surface parallel to the ground), and a control unit 205 that controls these units. Furthermore, the screen 201 is a touch panel having an input function to input a signal to the control unit 205.

(Control Unit)

When the control unit 205 is activated at a location at which the indoor unit 110 of the air-conditioning apparatus 100 is installed, in the case where the air-conditioning apparatus 100 is not registered in the center PC 400, the control unit 205 executes steps of assuming the location that the GPS 204 detects to be a location at which the indoor unit 110 is installed as a location at which the air-conditioning apparatus 100 is installed and causing the center PC 400 to register the location.

Then, when the control unit 205 is activated at the location at which the indoor unit 110 is installed after the location (the assumed location, to be exact) at which the air-conditioning apparatus 100 (indoor unit 110) is installed has been registered in the center PC 400, in the case where the air-conditioning apparatus 100 is registered in the center PC 400, the control unit 205 causes the screen 201 to display information about the air-conditioning apparatus 100.

It is noted that the location at which the indoor unit 110 is installed does not refer to the location of a wall on which the indoor unit 110 is actually installed but refers to a room in which the indoor unit 110 is installed, that is, a region close to the indoor unit 110 (for example, a region within about 3 m from the indoor unit 110). Furthermore, although the control unit 205 is activated in a region close to the indoor unit 110 as described above, the present invention is not limited to this situation, and the control unit 205 may be activated near the outdoor unit 120 of the air-conditioning apparatus 100.

(Control Flow)

In FIGS. 3 to 6, when the control unit 205 is activated (S1), a location at which the control unit 205 has been activated (identical to a location of the smartphone 200) is notified to the center PC 400, the center PC 400 determines whether or not the air-conditioning apparatus 100 is registered at the location of the smartphone 200 (S2), and the flow proceeds to a step (S51) of displaying information about the air-conditioning apparatus 100 when the air-conditioning apparatus 100 is registered.

On the other hand, when the air-conditioning apparatus 100 is not registered, a display asking whether or not registration is to be made is displayed on the screen 201 (S3). Then, when information that registration is not to be made is input, a control sequence performed by the control unit 205 is ended.

(Registration of Location)

In response to the display asking whether or not registration is to be made, when information that registration is to be made is input, a display prompting taking an image of the appearance of the air-conditioning apparatus 100 or an image of a type number or QR code (registered trademark) attached to the air-conditioning apparatus 100 with the camera 202 is displayed on the screen 201 (S4).

Then, the center PC 400 is caused to register a location that the GPS 204 detects as a location at which the air-conditioning apparatus 100 is installed, and also the center PC 400 is caused to register the type of the air-conditioning apparatus 100 identified on the basis of the image taken with the camera 202 (S5).

Furthermore, in the case where the smartphone 200 includes an altimeter, such as a barometer, capable of detecting a vertical location (height) of the smartphone 200, the height detected by the altimeter is also registered together with the location on the ground or on the surface parallel to the ground.

It is noted that, in the case where the type of the air-conditioning apparatus 100 has been input in the control unit 205 in advance, the display prompting taking an image (S4) is unnecessary and therefore does not appear, and, when information that registration is to be made is input, the center PC 400 is caused to register the location at which the air-conditioning apparatus 100 is installed.

Hence, when the control unit 205 is activated near the indoor unit 110 and a registration operation is performed, the air-conditioning apparatus 100 is registered in relation to the location at which the registration operation has been performed, and also when the control unit 205 is activated near the outdoor unit 120 and a registration operation is performed, the air-conditioning apparatus 100 is registered in relation to the location at which the registration operation has been performed.

In addition, if the control unit 205 is activated near the indoor unit 110 and a registration operation for an air-conditioning apparatus different from the air-conditioning apparatus 100 is performed, the two air-conditioning apparatuses are registered in relation to the location at which the registration operation has been performed. In addition, if the control unit 205 is activated at each of two locations away from each other and a registration operation for the air-conditioning apparatus 100 is performed, the air-conditioning apparatus 100 is registered in relation to the two locations away from each other.

Furthermore, the control unit 205 is capable of being included in different smartphones 200, and thus the registration operation and a display operation to be described later may be performed by the respective different smartphones 200.

(Example Display of Information)

Figure 3:
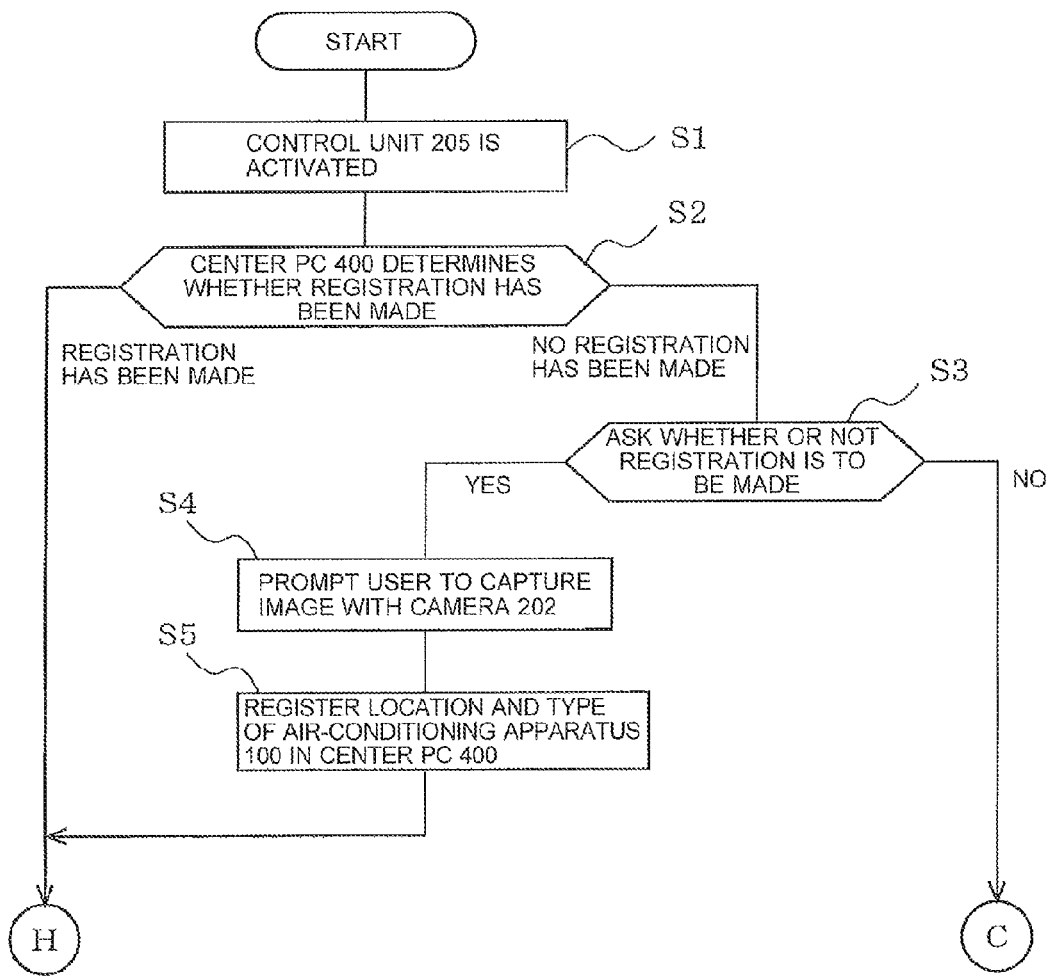
FIG. 3 is a flowchart illustrating a flow of control performed by a multifunctional mobile communication device control unit included in the component of the air-conditioning apparatus support system illustrated in FIG. 1.
Figure 4:
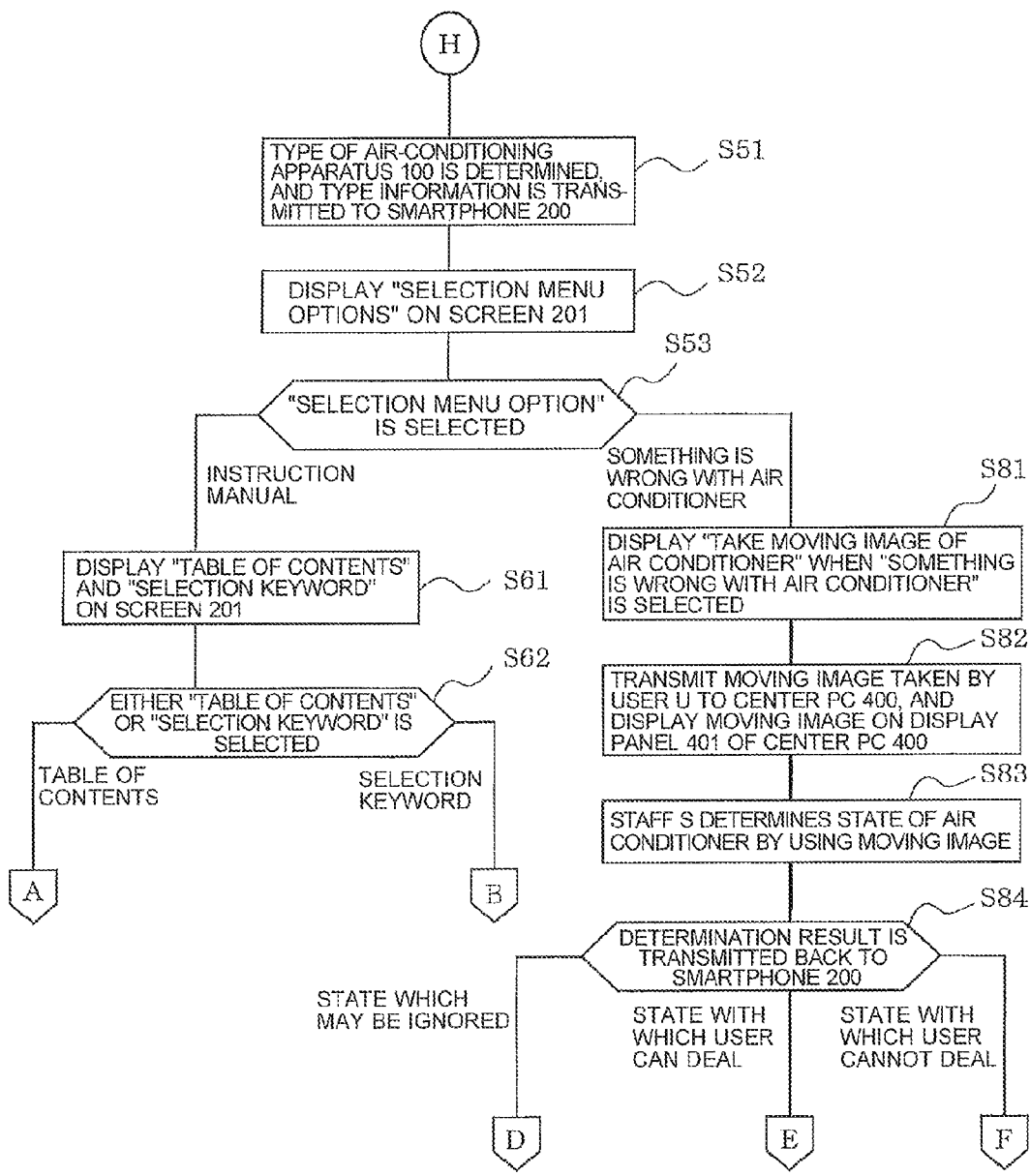
FIG. 4 is a flowchart illustrating a flow of control performed by the multifunctional mobile communication device control unit included in the component of the air-conditioning apparatus support system illustrated in FIG. 1.
Figure 5:
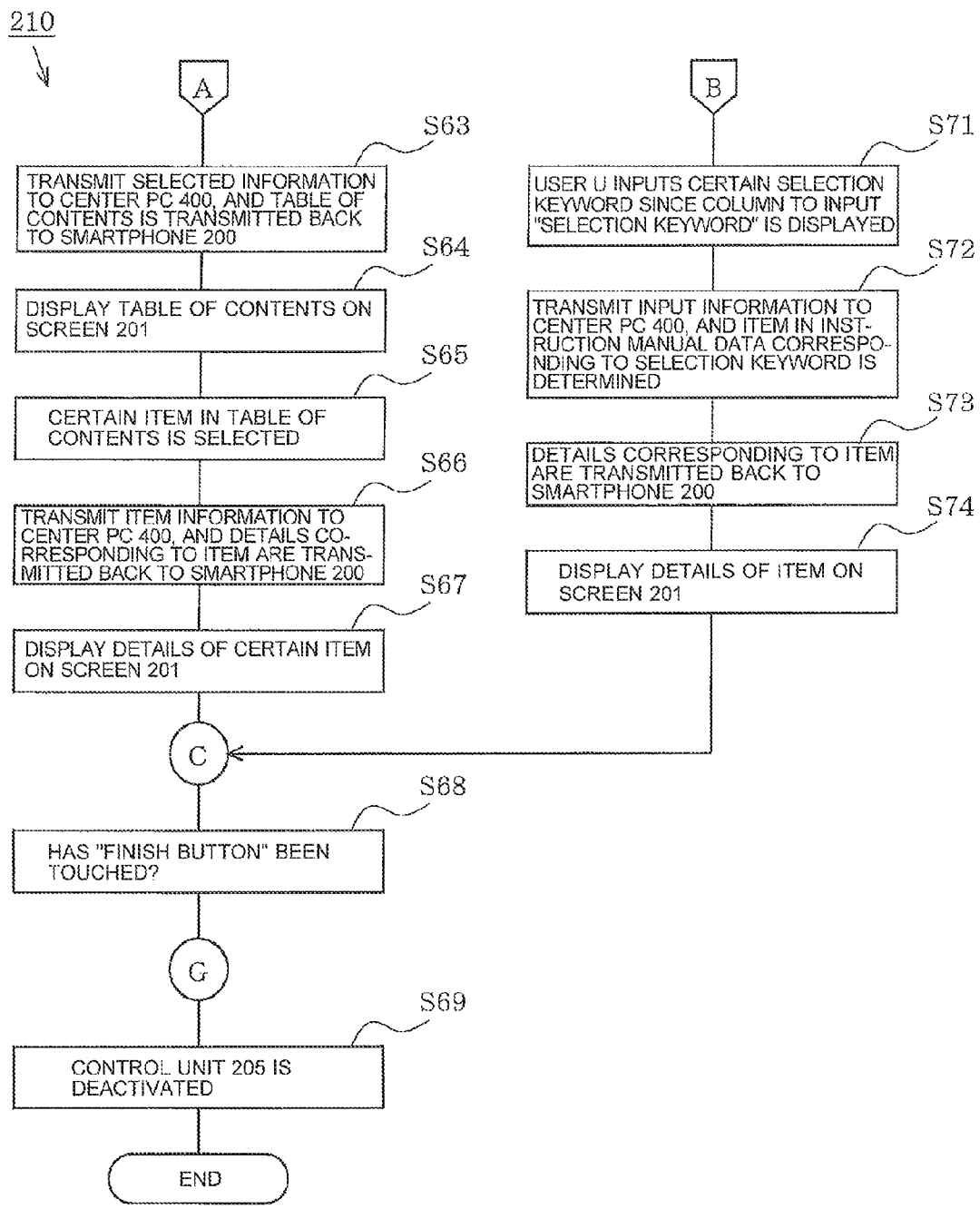
FIG. 5 is a flowchart illustrating a flow of control performed by the multifunctional mobile communication device control unit included in the component of the air-conditioning apparatus support system illustrated in FIG. 1.
Figure 6:
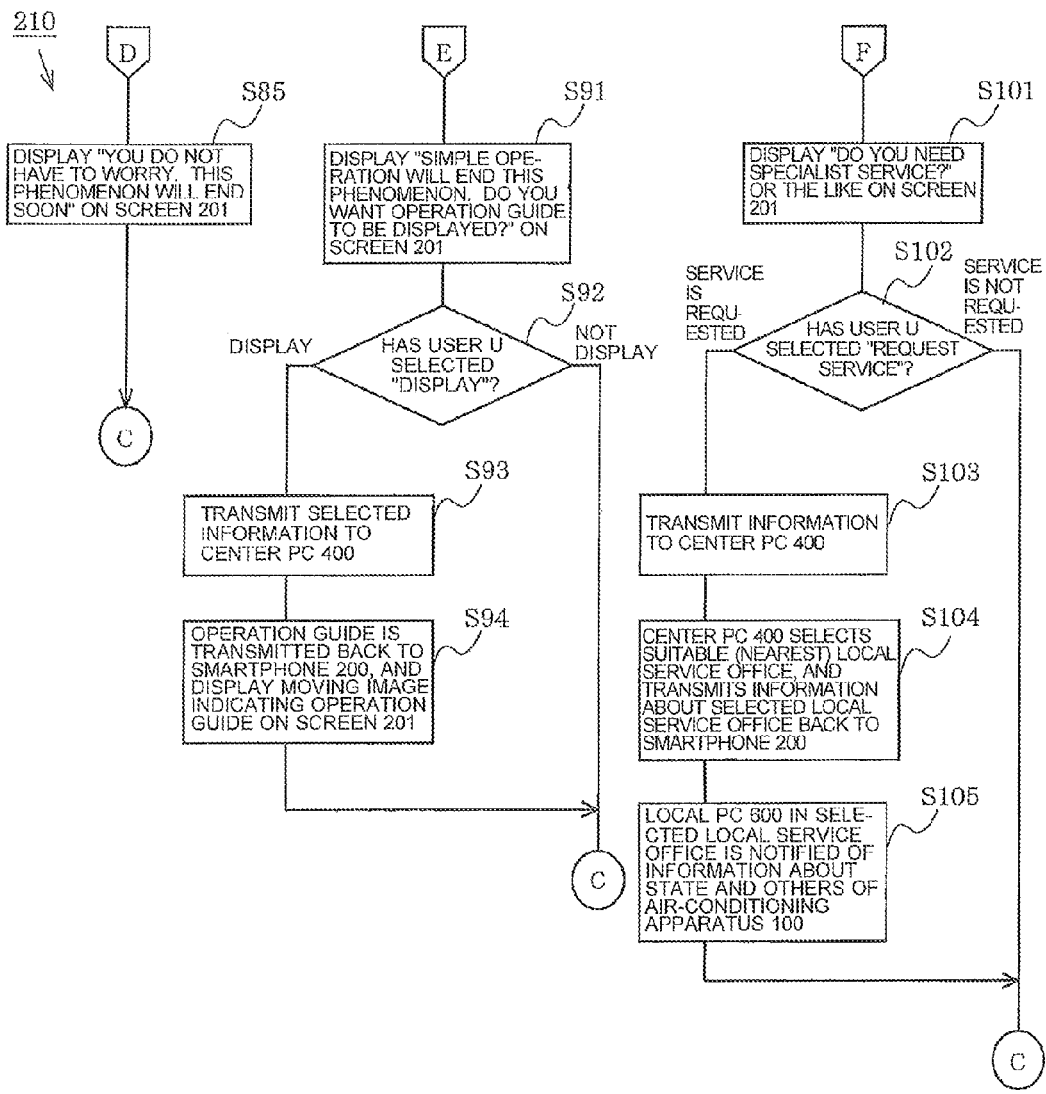
FIG. 6 is a flowchart illustrating a flow of control performed by the multifunctional mobile communication device control unit included in the component of the air-conditioning apparatus support system illustrated in FIG. 1.

In FIG. 3, when the location and the type of the air-conditioning apparatus 100 are registered, information about the air-conditioning apparatus 100 is displayed on the screen 201 (see S51 in FIG. 4).

First, the type name of the air-conditioning apparatus 100 and an image of its appearance are displayed on the screen 201, and the user U can therefore check that the air-conditioning apparatus 100 has been correctly identified by only activating the control unit 205 without spending time and effort on special work (for example, work of inputting a type name or taking an image of the appearance of the indoor unit 110).

Subsequently, the smartphone 200 displays "SELECTION MENU OPTIONS" on the screen 201 (S52) to ask for what purpose the user U has activated the control unit 205. The selection menu options are, for example, "READ THE INSTRUCTION MANUAL." and "SOMETHING IS WRONG WITH THE AIR CONDITIONER."

Then, when "READ THE INSTRUCTION MANUAL." is selected (S53), "TABLE OF CONTENTS" and "SELECTION KEYWORD" are displayed on the screen 201 (S61).

Then, when the user U selects "TABLE OF CONTENTS" (S62), the selected information is transmitted to the center PC 400, and the table of contents of the instruction manual is transmitted back to the smartphone 200 (S63).

Then, the table of contents is displayed on the screen 201 (S64), and thus, when the user U selects a certain item (for example, "TIMER SETTING") in the table of contents (S65), the item information is transmitted to the center PC 400, and details corresponding to the item in instruction manual data retained by the server 500 are transmitted back to the smartphone 200 (S66).

Then, the details of the certain item (for example, "HOW TO SET TIMER") are displayed on the screen 201 in the form of a still image or moving image (S67).

Furthermore, when a "FINISH" button displayed in a corner of the screen 201 (which is displaying the still image or moving image) is pressed (S68), the control unit 205 is deactivated (S69). On the other hand, when the "FINISH" button is not pressed, "SELECTION MENU OPTIONS" is displayed on the screen 201 (the flow returns to S52).

On the other hand, when "TABLE OF CONTENTS" and "SELECTION KEYWORD" are displayed in (S61), in the case where "SELECTION KEYWORD" is selected (S62), a column to input a "SELECTION KEYWORD" is displayed on the screen 201, and thus, when the user U inputs a certain selection keyword (for example, "BEFORE WAKING UP") (S71), the input information is transmitted to the center PC 400, and the center PC 400 determines an item (for example, "TIMER SETTING") in the instruction manual data corresponding to the selection keyword, transmits the item information to the server 500 (S72), and transmits details corresponding to the item in the instruction manual data retained by the server 500 back to the smartphone 200 (S73).

Then, the details of the item (for example, "HOW TO SET TIMER") are displayed on the screen 201 in the form of a still image or moving image (S74).

Furthermore, when a "FINISH" button displayed in a corner of the screen 201 (which is displaying the still image or moving image) is pressed (S68), the control unit 205 is deactivated (S69).

Furthermore, when "SOMETHING IS WRONG WITH THE AIR CONDITIONER." is selected in (S53), "TAKE A MOVING IMAGE OF THE AIR CONDITIONER." is displayed on the screen 201 (S81).

Then, the taken moving image of the indoor unit 110 (or the outdoor unit 120) is transmitted to the center PC 400, and the moving image is displayed on a display panel 401 of the center PC 400 (S82).

Then, a staff S (who has already known the type of the air-conditioning apparatus 100) on standby in a support center determines, on the basis of the moving image, the state of the air conditioner (S83), that is, whether the air conditioner is in a "STATE WHICH MAY BE IGNORED", "STATE WITH WHICH THE USER U CAN DEAL", or "STATE WITH WHICH THE USER U CANNOT DEAL", and transmits a determination result back to the smartphone 200 (S84).

Then, in the case where it is determined that the air conditioner is in "STATE WHICH MAY BE IGNORED", when "YOU DO NOT HAVE TO WORRY. THIS PHENOMENON WILL END SOON.", for example, is displayed on the screen 201 (S85), the user U can feel secure.

Furthermore, in the case where it is determined that the air conditioner is in "STATE WITH WHICH THE USER U CAN DEAL", "SIMPLE OPERATION WILL END THIS PHENOMENON. DO YOU WANT AN OPERATION GUIDE TO BE DISPLAYED?", for example, is displayed on the screen 201 (S91), and, when the user U selects "DISPLAY" (S92), the selected information is transmitted to the center PC 400 (S93), the operation guide retained in the server 500 is transmitted back to the smartphone 200, and a moving image (or a plurality of still images) indicating the operation guide is displayed on the screen 201 (S94).

Hence, the user U can perform certain operation while viewing the moving image (or the plurality of still images) displayed on the screen 201, thereby enabling a return of the state of the air conditioner to a regular state.

Furthermore, in the case where it is determined that the air conditioner is in "STATE WITH WHICH THE USER U CANNOT DEAL" in (S83), for example, "DO YOU NEED A SPECIALIST SERVICE?" is displayed on the screen 201 (S101).

Then, when the user U selects "YES" (S102), the information is transmitted to the center PC 400 (S103), the center PC 400 selects a suitable (nearest) local service office with reference to the location information of the air-conditioning apparatus 100, and transmits information (the name, the location on a map, and the like) about the local service office back to the smartphone 200 (S104). Furthermore, as for the local service office, the local PC 600 is notified of information about the type and state of the air-conditioning apparatus 100, and information about the user U. (S105).

It is noted that, when the user U selects "NO" in (S102), the control performed by the control unit 205 is ended (S69).

Hence, according to the support system 1000, once the air-conditioning apparatus 100 has been registered, the user U does not have to spend time and effort on special work (for example, work of inputting the type name or taking an image of the appearance of the indoor unit 110), only activates the control unit 205, and thereby can read the content of the instruction manual, in particular, the most desired details with simple operation and also a moving image. Furthermore, when something is wrong with the air-conditioning apparatus 100, the user U can know an appropriate way of dealing with the problem. At this time, the staff S can diagnose the state of the air conditioner by viewing a moving image, and can therefore make a determination more correctly.

It is noted that, since the registration operation and the display operation for information can be performed by the respective different smartphones 200, for example, if a serviceman sent from a local service office performs the registration operation at the time of installation of the air-conditioning apparatus 100, the user U can obtain desired information by only activating the control unit 205 without performing the registration operation. Furthermore, after the registration operation, even a serviceman who happens to visit can obtain desired information by only activating the control unit 205.

(Air-Conditioning Apparatus)

Figure 7:
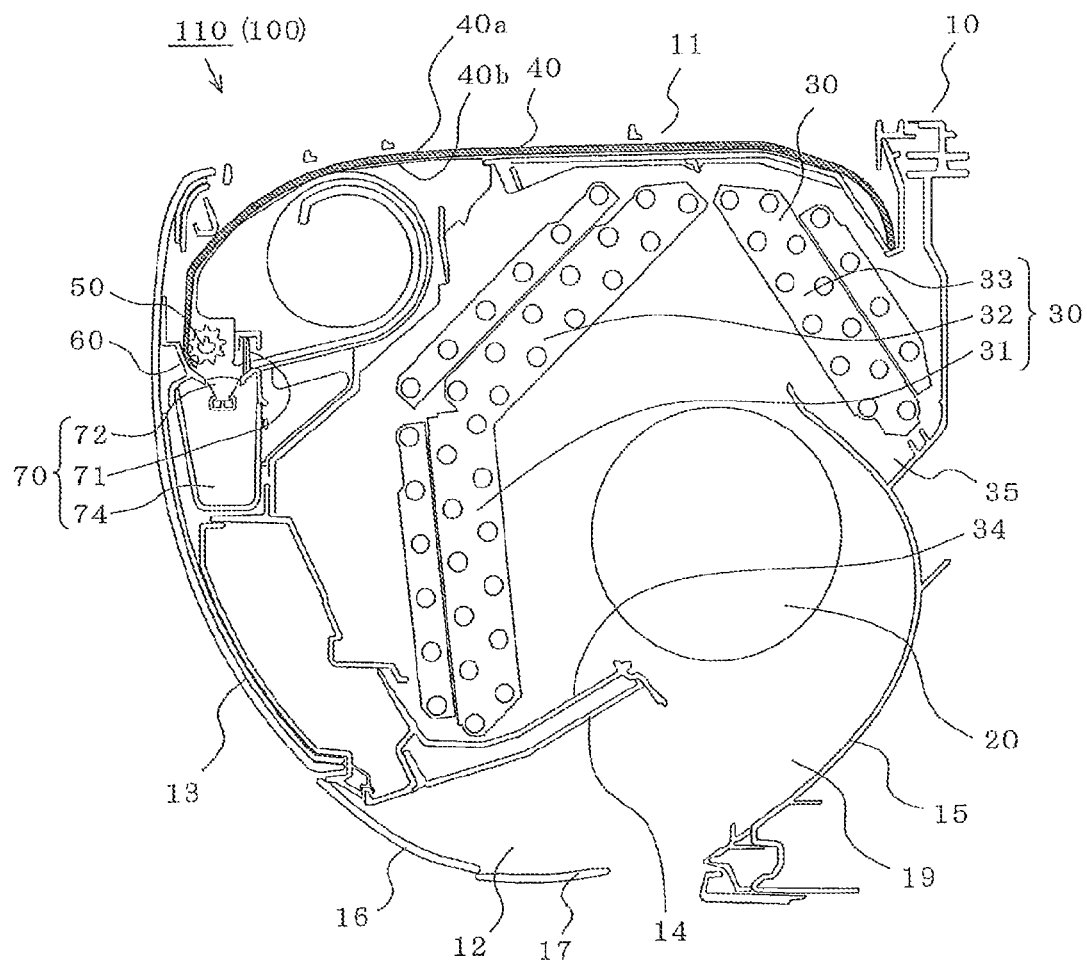
FIG. 7 is a cross-sectional side view illustrating the entirety of an indoor unit of an air-conditioning apparatus constituting the air-conditioning apparatus support system according to Embodiment 1 of the present invention.
Figure 8:
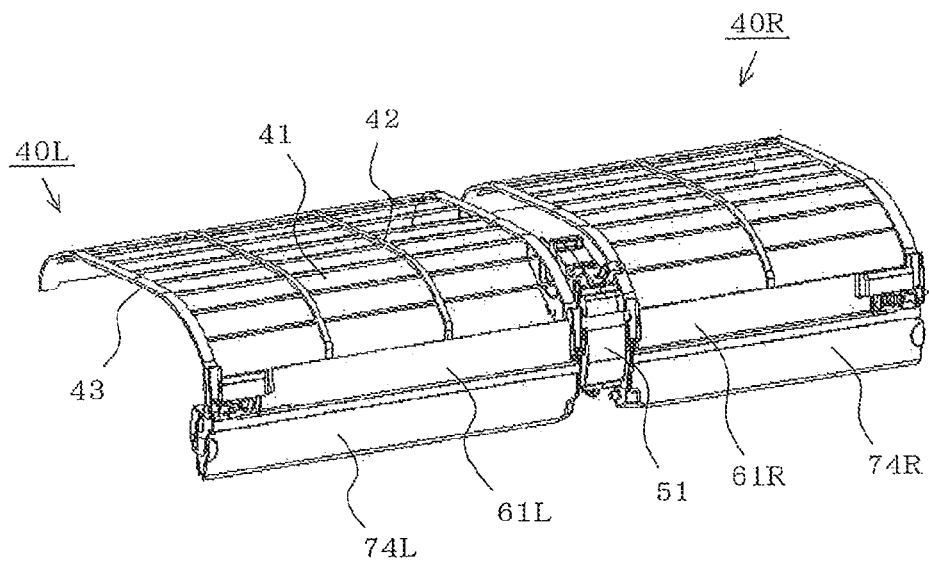
FIG. 8 is a perspective view illustrating some portions (a filter and a filter cleaning device) pulled out of the indoor unit illustrated in FIG. 7.
Figure 9:
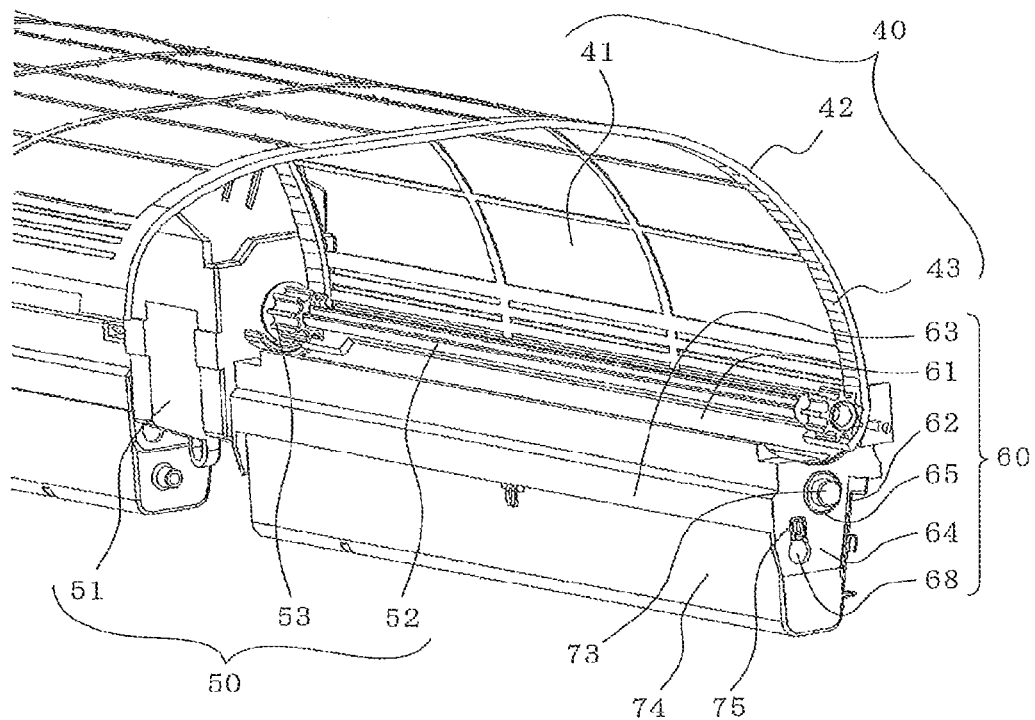
FIG. 9 is a perspective view illustrating some portions (the filter and the filter cleaning device) pulled out of the indoor unit illustrated in FIG. 7.
Figure 10:
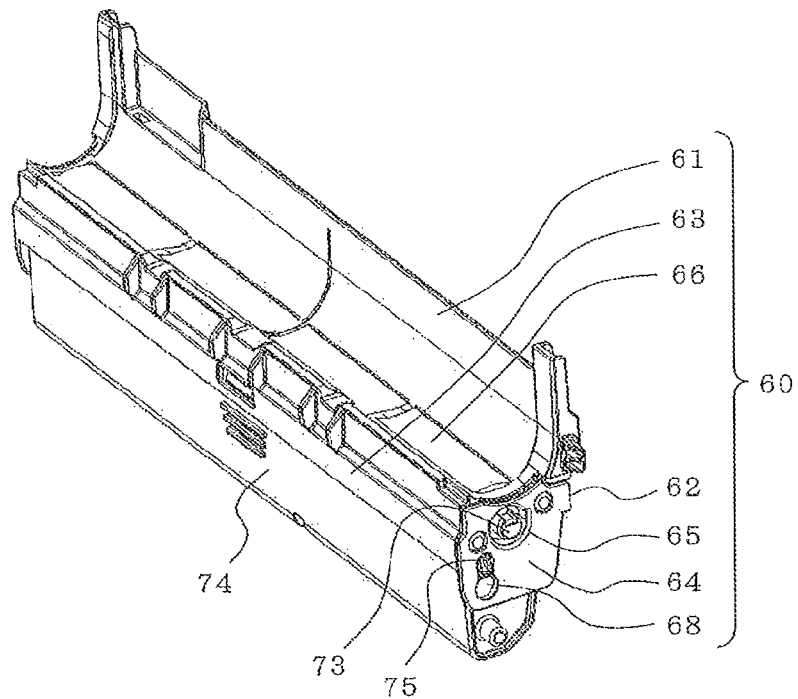
FIG. 10 is a perspective view illustrating some portions (a filter guide device and the filter cleaning device) pulled out of the indoor unit illustrated in FIG. 7.
Figure 11:
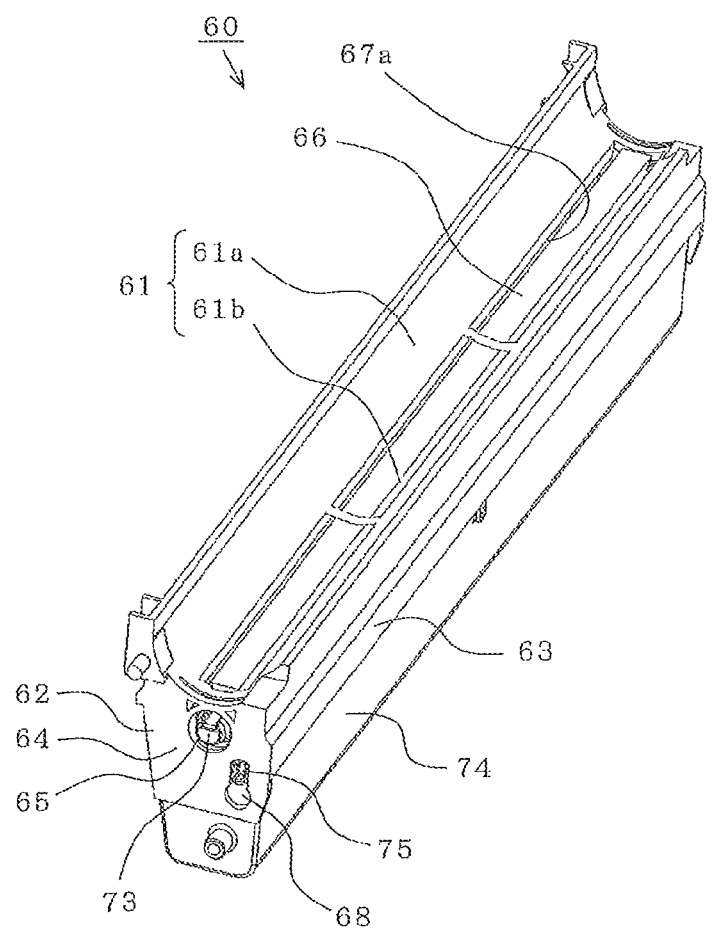
FIG. 11 is a perspective view illustrating some portions (the filter guide device and the filter cleaning device) pulled out of the indoor unit illustrated in FIG. 7.
Figure 12:
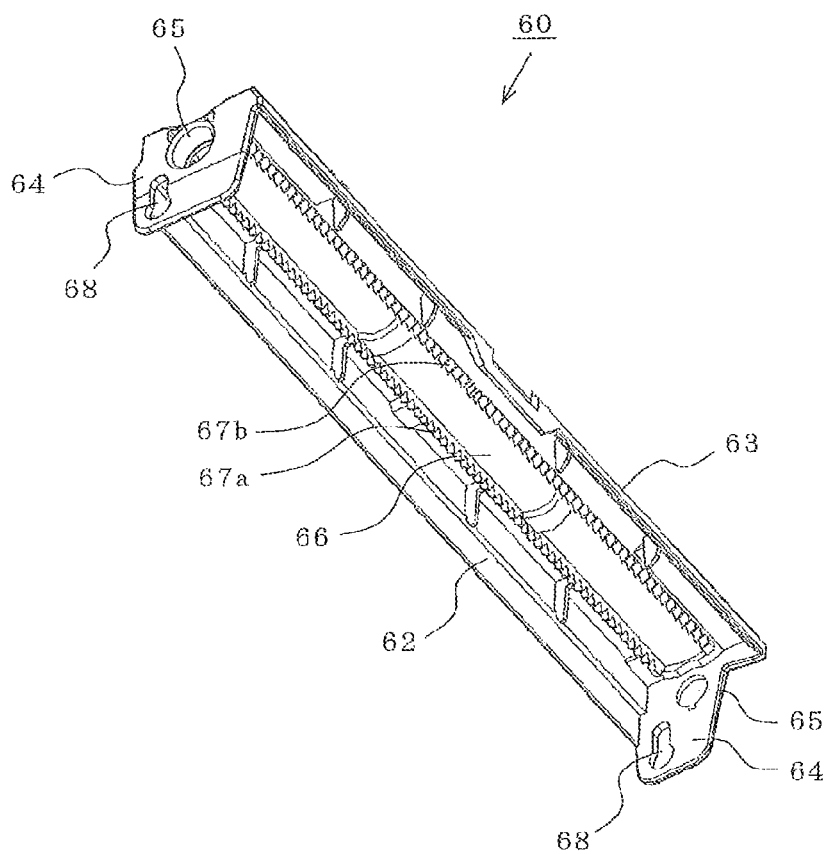
FIG. 12 is a perspective view illustrating a portion (the filter guide device) pulled out of the indoor unit illustrated in FIG. 7.

FIGS. 7 to 12 each illustrate the indoor unit of the air-conditioning apparatus constituting the air-conditioning apparatus support system according to Embodiment 1 of the present invention, FIG. 7 is a cross-sectional side view illustrating the entirety of the indoor unit, FIGS. 8 and 9 are each a perspective view illustrating some portions (a filter and a filter cleaning device) pulled out, FIGS. 10 and 11 are each a perspective view illustrating some portions (a filter guide device and the filter cleaning device) pulled out, and FIG. 12 is a perspective view illustrating a portion (the filter guide device) pulled out. It is noted that each figure is schematically illustrated and the present invention is not limited to the illustrated forms.

In FIGS. 7 and 8, the indoor unit 110 of the air-conditioning apparatus (hereinafter, it may simply be referred to as "indoor unit") 100 includes an indoor unit body 10 composed of a housing, a blower fan 20 that is disposed in the indoor unit body 10 and that sucks in air and also blows out the sucked air (conditioned air, to be exact), a heat exchanger 30 that is disposed in an air channel created by the blower fan 20 and conditions the sucked air, an air filter (hereinafter referred to as "filter") 40 that captures dust contained in the sucked air, a filter advance and retraction device 50 that advances and retracts (moves) the filter 40, a filter guide device 60 that reverses the upper and lower sides of the filter 40, and a filter cleaning device 70 that removes dust adhering to the filter 40.

It is noted that the air-conditioning apparatus 100 includes an outdoor unit, which is not illustrated. Then, a refrigeration cycle is performed by a refrigerant compressor, an outdoor heat exchanger, and refrigerant expansion means that are mounted in the outdoor unit, the heat exchanger 30 mounted in the indoor unit 110, and a refrigerant circuit that connects these components in sequence. Then, to optimally perform the refrigeration cycle, an outdoor blower fan is mounted in the outdoor unit. Hence, "component for performing the refrigeration cycle" in the present invention is a generic term referring to at least the refrigerant compressor, the outdoor heat exchanger, the refrigerant expansion means, the heat exchanger 30, the refrigerant circuit, the outdoor blower fan, and the blower fan 20, and refers to a whole into which the components are integrated or each of the discrete components.

It is noted that the filter 40 refers to a left filter 40L and a right filter 40R that are respectively disposed on the left and the right, and a common filter advance and retraction drive motor box 51 that advances and retracts both the filters is disposed between both the filters. It is noted that the present invention is not limited to the above form, and independent (separate) filter advance and retraction drive motor boxes 51 that advance and retract the respective filters 40 may be disposed. Furthermore, the filter 40 is not limited to the left and right paired filters.

(Indoor Unit Body)

The indoor unit body 10 is a housing, both sides (not illustrated) of which are covered. The indoor unit body 10 is open in the top (the upper side in FIG. 7, identical to an upper region of the indoor unit body) in which the opening is formed as an air inlet 11 that sucks in air, and is open in part of the bottom (the lower side in FIG. 7) and in the front (a region close to the bottom on the left side in FIG. 7, identical to a lower region of the indoor unit body) in which an air outlet 12 that discharges the air sucked from the air inlet 11 is formed. Then, the indoor unit body 10 is open in the front (the left side in FIG. 7) in which a design panel 13 that covers and uncovers the opening is disposed. It is noted that the rear (the right side in FIG. 7) is covered.

(Blower Fan)

When viewed from the side, the blower fan 20 is disposed between the air inlet 11 and the air outlet 12 of the indoor unit body 10, and creates an air flow running from the air inlet 11 to the air outlet 12. A discharge side air channel 19 between the blower fan 20 and the air outlet 12 is a space substantially sandwiched between an air channel front plate 14 and an air channel rear plate 15, and a horizontal air vane (not illustrated) that controls a horizontal direction in which conditioned air is discharged is disposed in the discharge side air channel 19. Furthermore, vertical air flaps 16 and 17 that control a vertical direction in which the conditioned air is discharged are disposed in the air outlet 12.

It is noted that the vertical air flaps 16 and 17 are removable, and, in the case where they are not installed in correct positions, a sensor, which is not illustrated, detects this incorrect installation, the detection signal is transmitted to a body control unit, and thus the air-conditioning apparatus 100 is not activated in accordance with a command of the body control unit.

(Heat Exchanger)

The heat exchanger 30 is a device that conditions (for example, cools, heats, and removes moisture from) sucked air, and is composed of a first heat exchanger 31 disposed close to a lower portion on the front side, a second heat exchanger 32 disposed to extend from an upper portion on the front side to the top, and a third heat exchanger 33 disposed to extend from the top to an upper portion on the rear side. These heat exchangers are disposed between the air inlet 11 and the blower fan 20 (identical to the upstream side of the blower fan 20) to surround the blower fan 20 in a substantially Λ (lambda)-shape or a substantially inverted U-shape when viewed from the side.

Furthermore, a drain pan 34 and a drain pan 35 are respectively provided under the first heat exchanger 31 and the third heat exchanger 33, and capture drained water dripping from the respective heat exchangers.

It is noted that air that has been conditioned is referred to as "conditioned air" in the present invention. Furthermore, the form of the configuration and arrangement of the heat exchanger 30 is not limited to the illustrated form.

(Filter)

In FIG. 7, between the air inlet 11 and the heat exchanger 30 of the indoor unit body 10, that is, on the upstream side of the heat exchanger 30, the air filter (hereinafter referred to as "filter") 40 is advanced (pulled out) to cover the entire air inlet 11 during ordinary times, and is also moved (for example, wound up) to be retracted from the air inlet 11 by the filter advance and retraction device 50 during filter cleaning, and one or both of the left filter 40L disposed on the left side when viewed from the front side and the right filter 40R disposed on the right side when viewed from the front side are illustrated.

In the following description, since the left filter 40L and the right filter 40R have the same form, "left" and "right" in their names or suffixes "L" and "R" added to the reference numerals are omitted with regard to descriptions common to these filters. Also as regards other components disposed on the left and the right when viewed from the front, "left" and "right" in their names or suffixes "L" and "R" added to the reference numerals are omitted with regard to descriptions common to these components.

In FIG. 8, a pair of the filters 40 is disposed on the left and right of the indoor unit body 10 (with the filter advance and retraction drive motor box 51 of the filter advance and retraction device 50 interposed therebetween). Furthermore, the filter 40 has a substantially rectangular shape longer in a front-rear direction (depth) than in a left-right direction, and is composed of a filter ventilation member (mesh member) 41 and a substantially lattice filter frame member 42 in which the filter ventilation member 41 is provided.

Then, filter driven teeth 43 are formed in a pattern of equally spaced projections and depressions on one side of portions parallel to the front-rear direction of the filter frame member 42. Furthermore, the filter frame member 42 is molded from flexible material and is formed into a flat plate shape when molded. When the filter frame member 42 is mounted in the indoor unit 110 of the air-conditioning apparatus, it can be turned into a shape bent in a substantially J-shape or a shape in which it can be wound up in a substantially spiral manner when viewed from the side since it is flexible.

(Filter Advance and Retraction Device)

In FIG. 9, the filter advance and retraction device 50 is disposed close to an upper portion of the front (in substantially the middle in the vertical direction or a position close to the top on the upper portion side) of the indoor unit body 10 and includes filter drive gear wheels 53 that mesh with the filter driven teeth 43 of the filter 40, a filter drive shaft 52 to which the filter drive gear wheels 53 are fixed, and the filter advance and retraction drive motor box 51 that houses a drive motor, which is not illustrated, that drives and rotates the filter drive shaft 52. Then, the filter advance and retraction drive motor box 51 is disposed close to the front of the indoor unit body 10 in substantially the middle in the left-right direction.

Furthermore, one end of the filter drive shaft 52 is rotatably supported by a shaft bearing, which is not illustrated, provided in the filter advance and retraction drive motor box 51, and the other end of the filter drive shaft 52 is rotatably supported by a shaft bearing, which is not illustrated, provided in the indoor unit body 10.

(Filter Guide Device)

In FIGS. 10 to 12, the filter guide device 60 guides the filter 40 so that the side facing the upstream side of the air channel when the filter 40 is advanced into the air channel faces downward when the filter 40 is retracted from the air channel (guides the filter 40 so that the side facing downward when advanced faces upward when retracted).

The filter guide device 60 is a box member being open in its bottom, and is composed of a substantially J-shaped guide top plate 61 that has a substantially linear region 61a and a substantially arc-shaped region 61b when viewed from the side, a guide front plate 62 that is provided to extend downward from the front edge of the substantially arc-shaped region 61b of the guide top plate 61, a guide rear plate 63 that is provided to extend downward from the rear edge of the substantially arc-shaped region 61b, and a pair of guide end plates 64 that are disposed in the substantially arc-shaped region 61b of the guide top plate 61, the guide front plate 62, and the guide rear plate 63, and that cover the ends of the substantially arc-shaped region 61b of the guide top plate 61.

Then, in the pair of guide end plates 64, there are provided surface cleaning brush shaft bearings 65 that support both ends of a surface cleaning brush swing shaft 73 constituting the filter cleaning device 70 so that they are swingable (repeatedly rotated normally and reversely within a certain rotation angle), and mounting holes 68 into which mounting projections 75 of a dust box (identical to a dust chamber) 74 are insertable.

Furthermore, dust passage slots 66, which are through slots with a certain width, are formed in a position corresponding to the lowest point of the substantially J-shaped guide top plate 61 when viewed from the side, and substantially wavy scraper projections 67a and 67b (hereinafter each or both of them may be referred to as "scraper projection 67") projecting downward are provided on the underside of the guide top plate 61 along the side edges of the dust passage slots 66 in the longitudinal direction (identical to the left-right direction of the indoor unit body 10) or in parallel to the side edges (at a certain distance away from the side edges).

Then, when the filter guide device 60 is installed in the indoor unit body 10, the upper side of the guide top plate 61 and the filter drive gear wheels 53 of the filter advance and retraction device 50 face each other, and a certain space is formed therebetween. That is, one side of the filter 40 is contact with the guide top plate 61, and the filter drive gear wheels 53 mesh with the filter driven teeth 43 formed on the other side.

It is noted that the filter 40 is removable, and, in the case where it is not installed in a correct position with respect to the filter guide device 60, a sensor, which is not illustrated, detects this incorrect installation, the detection signal is transmitted to the body control unit, and thus the air-conditioning apparatus 100 is not activated in accordance with a command of the body control unit.

(Filter Cleaning Device)

In FIG. 7, the filter cleaning device 70 includes a surface cleaning brush 72 that is capable of coming into contact with the side of the filter 40 guided by the filter guide device 60 and facing downward, a back surface cleaning brush 71 that is capable of coming into contact with the side facing upward, and the dust box 74 that stores dust removed from the filter 40. It is noted that the back surface cleaning brush 71 may be omitted.

(Dust Box)

The dust box 74 is a box member being open in its top and is disposed under the surface cleaning brush 72 (identical to under the guide top plate 61 of the filter guide device 60), and the upper edge thereof is located in close contact with the guide front plate 62, the guide rear plate 63, and the pair of guide end plates 64 of the filter guide device 60.

At this time, since the mounting projections 75 projecting in the left-right direction in which the dust box 74 is disposed have been inserted into the mounting holes 68 formed in the guide end plates 64, the dust box 74 does not fall off the filter guide device 60.

Hence, since the dust box 74 is in a state in which it is covered with the substantially arc-shaped region 61b of the guide top plate 61 of the filter guide device 60 with the guide front plate 62, the guide rear plate 63, and the pair of guide end plates 64 interposed therebetween, dust having fallen into the dust box 74 does not scatter into the surroundings.

(Cleaning Brush)

The surface cleaning brush 72 is provided (embedded) in the surface cleaning brush swing shaft 73, and the surface cleaning brush swing shaft 73 is rotatably supported by the surface cleaning brush shaft bearings 65 disposed under the guide top plate 61 (the substantially arc-shaped region 61b, to be exact) of the filter guide device 60. At this time, although the surface cleaning brush 72 is embedded in a range of substantially 15 degrees in the circumferential direction of the surface cleaning brush swing shaft 73, the present invention does not limit the range, and the surface cleaning brush 72 is desirably embedded in a range of substantially not more than 90 degrees.

Then, the surface cleaning brush swing shaft 73 is parallel to the lowermost line of the substantially arc-shaped region 61b of the guide top plate 61 (an imaginary lowermost line, to be exact, since the dust passage slots 66 are formed).

Furthermore, swing means (not illustrated) is connected to the surface cleaning brush swing shaft 73, and the surface cleaning brush swing shaft 73 swings in a certain angular range (for example, 90 degrees each in the front and rear directions with respect to a vertical line).

Furthermore, the back surface cleaning brush 71 is disposed above the guide top plate 61 of the filter guide device 60, and is fixed to the indoor unit body 10 with the tip thereof facing downward.

Hence, when the filter 40 is advanced and retracted while sliding over the substantially arc-shaped region 61b, the tip of the surface cleaning brush 72 comes into contact with one side of the filter 40 and swings in the front-rear direction, and the tip of the back surface cleaning brush 71 comes into contact with the other side of the filter 40 and swings.

Then, dust captured by the filter 40 is removed by the surface cleaning brush 72 and the back surface cleaning brush 71, and falls into the dust box 74 through the dust passage slots 66.

Furthermore, the dust that remains adhering to the surface cleaning brush 72 is scraped off the surface cleaning brush 72 by the scraper projection 67, and falls into the dust box 74.

It is noted that the dust box 74 is removable, and, in the case where the dust box 74 is not installed in a correct position, a sensor, which is not illustrated, detects this incorrect installation, the detection signal is transmitted to the body control unit, and thus the air-conditioning apparatus 100 is not activated in accordance with a command of the body control unit.

(Example Display Provided by Display Unit)

Figure 13:
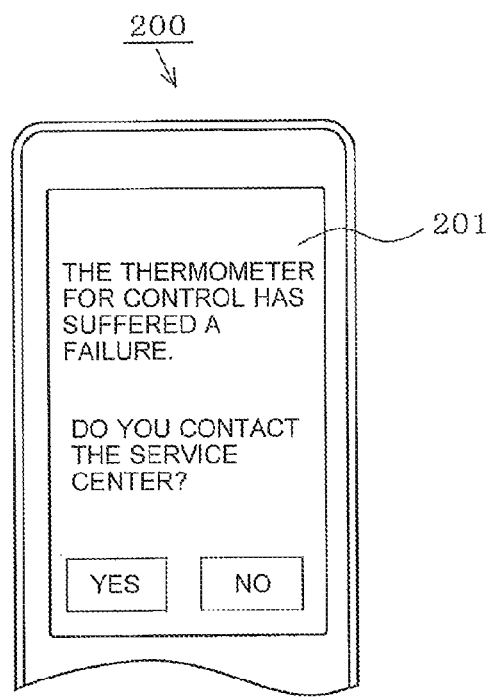
FIG. 13 is a front view illustrating an example display of repair displayed on a display unit of the multifunctional mobile communication device (smartphone) constituting the air-conditioning apparatus support system illustrated in FIG. 1.
Figure 14:
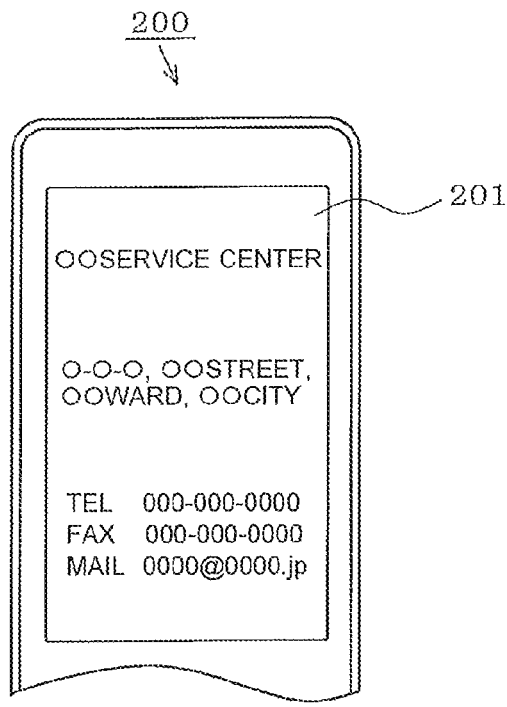
FIG. 14 is a front view illustrating an example display of repair displayed on the display unit of the multifunctional mobile communication device (smartphone) constituting the air-conditioning apparatus support system illustrated in FIG. 1.
Figure 15:
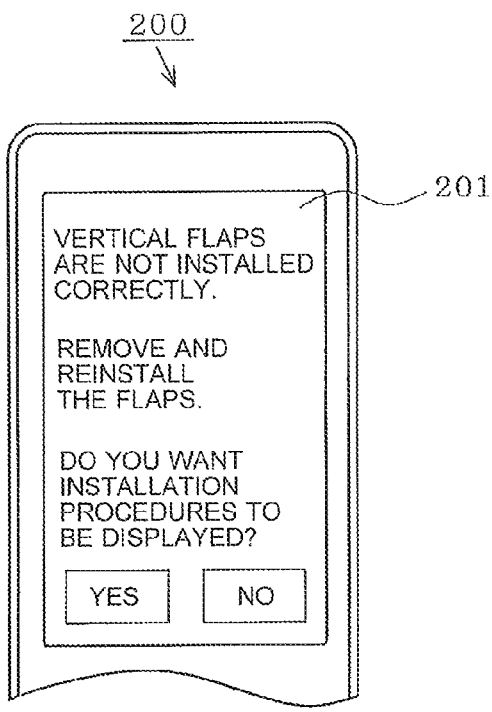
FIG. 15 is a front view illustrating an example display of repair of an installation failure displayed on the display unit of the multifunctional mobile communication device (smartphone) constituting the air-conditioning apparatus support system illustrated in FIG. 1.
Figure 16:
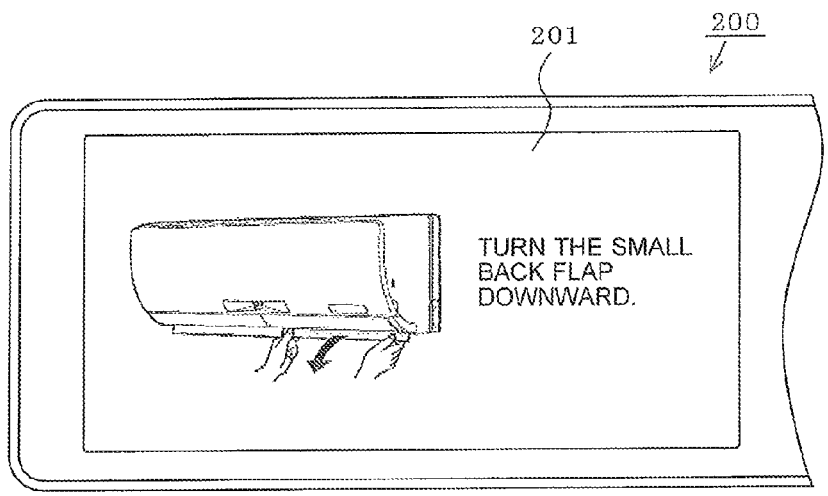
FIG. 16 is a front view illustrating an example display for resolving the installation failure displayed on the display unit of the multifunctional mobile communication device (smartphone) constituting the air-conditioning apparatus support system illustrated in FIG. 1.
Figure 17:
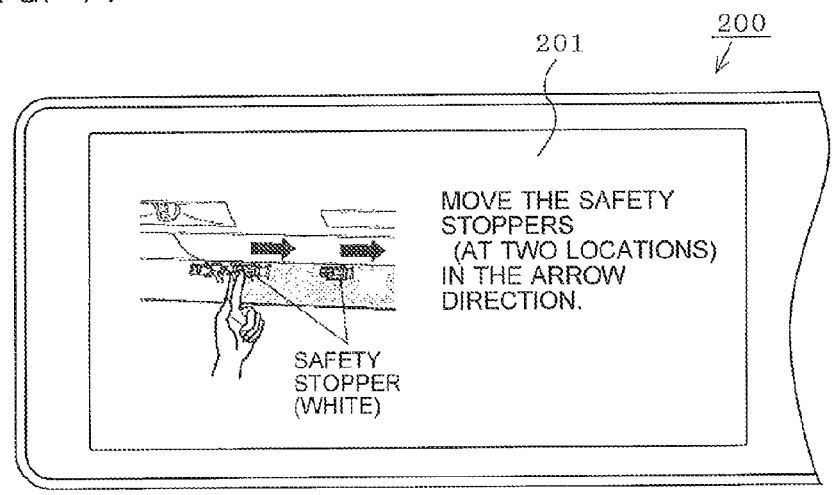
FIG. 17 is a front view illustrating an example display for resolving the installation failure displayed on the display unit of the multifunctional mobile communication device (smartphone) constituting the air-conditioning apparatus support system illustrated in FIG. 1.
Figure 18:
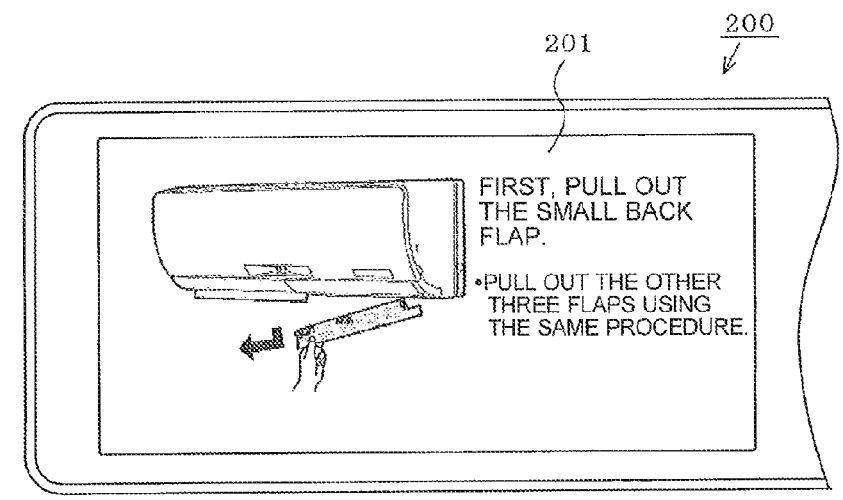
FIG. 18 is a front view illustrating an example display for resolving the installation failure displayed on the display unit of the multifunctional mobile communication device (smartphone) constituting the air-conditioning apparatus support system illustrated in FIG. 1.
Figure 19:
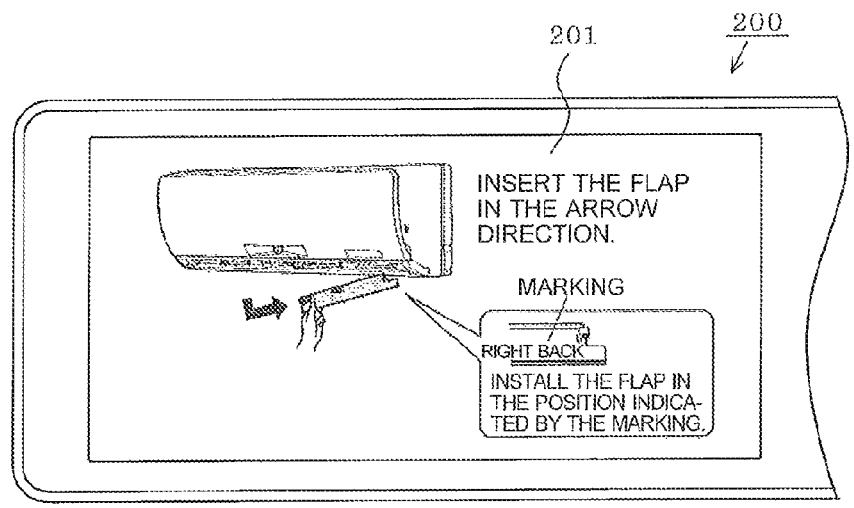
FIG. 19 is a front view illustrating an example display for resolving the installation failure displayed on the display unit of the multifunctional mobile communication device (smartphone) constituting the air-conditioning apparatus support system illustrated in FIG. 1.
Figure 20:
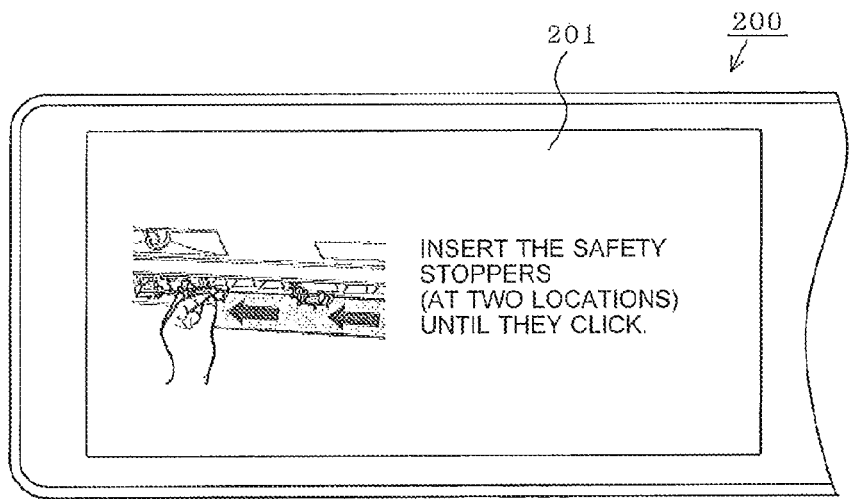
FIG. 20 is a front view illustrating an example display for resolving the installation failure displayed on the display unit of the multifunctional mobile communication device (smartphone) constituting the air-conditioning apparatus support system illustrated in FIG. 1.
Figure 21:
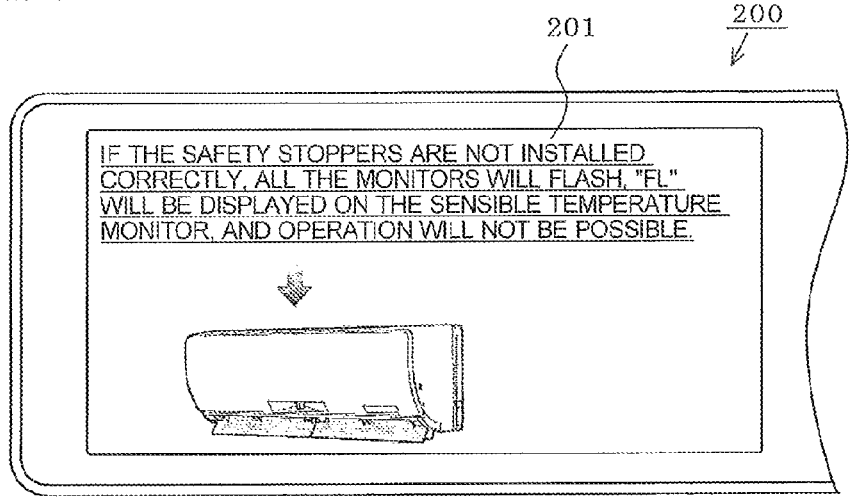
FIG. 21 is a front view illustrating an example display for resolving the installation failure displayed on the display unit of the multifunctional mobile communication device (smartphone) constituting the air-conditioning apparatus support system illustrated in FIG. 1.
Figure 22:
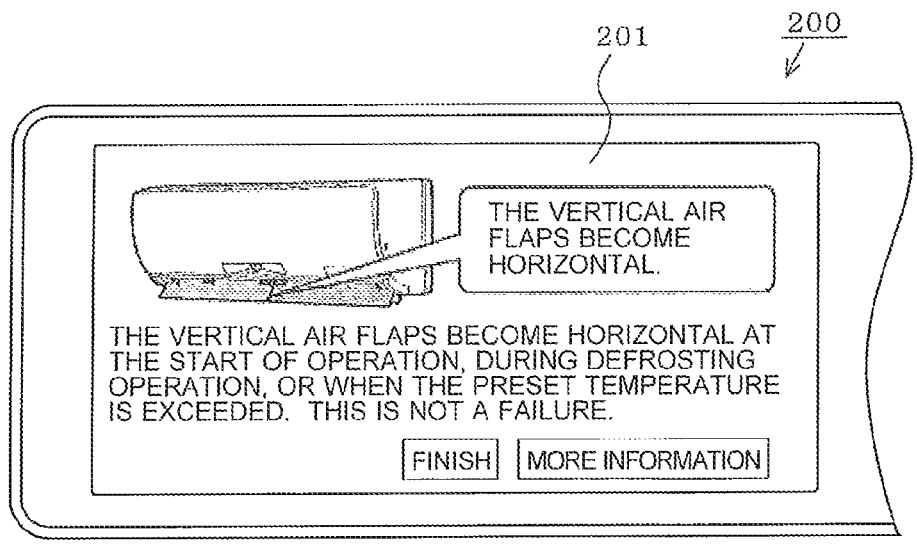
FIG. 22 is a front view illustrating an example display on the display unit of the multifunctional mobile communication device (smartphone) constituting the air-conditioning apparatus support system illustrated in FIG. 1 to resolve user's doubt about failure.
Figure 23:
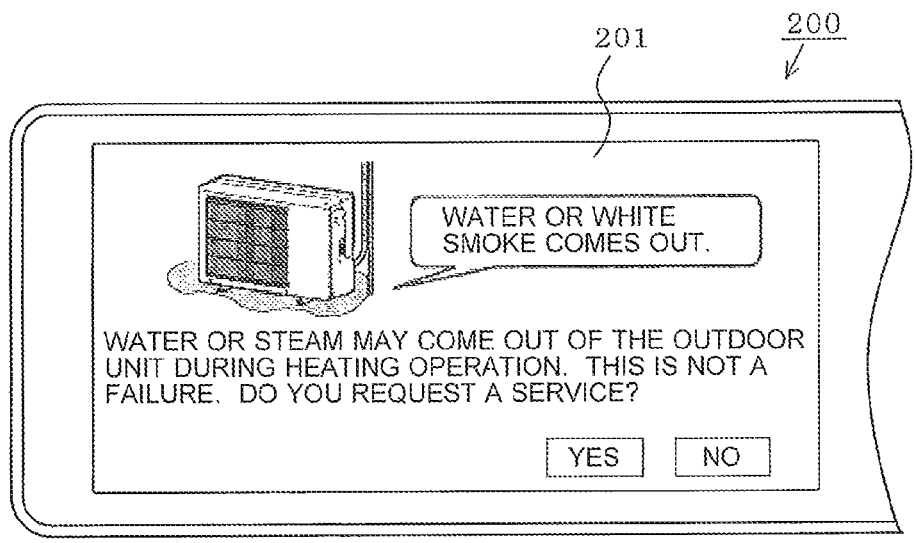
FIG. 23 is a front view illustrating an example display on the display unit of the multifunctional mobile communication device (smartphone) constituting the air-conditioning apparatus support system illustrated in FIG. 1 to resolve user's doubt about failure.

FIGS. 13 to 23 are each a front view illustrating an example display displayed on the display unit of the multifunctional mobile communication device (smartphone) constituting the air-conditioning apparatus support system according to Embodiment 1 of the present invention, FIGS. 13 and 14 each illustrate an example display of repair, FIG. 15 illustrates an example display of an installation failure, FIGS. 16 to 18 each illustrate an example display for resolving the installation failure, FIGS. 19 to 21 each illustrate an example display for resolving the installation failure, and FIGS. 22 and 23 each illustrate an example display for resolving user's doubt about failure.

Next, an example image (characters or graphics) displayed on the screen 201 of the smartphone 200 is presented. For example, when the staff S of the support center determines the state of the air conditioner on the basis of the transmitted moving image (S83 illustrated in FIG. 4), the determination result is transmitted to the smartphone 200 (S84 illustrated in FIG. 4), and the details thereof are displayed on the screen 201.

(Example Display of Repair)

In FIG. 13, "THE THERMOMETER FOR CONTROL HAS SUFFERED A FAILURE. DO YOU CONTACT THE SERVICE CENTER?" is displayed on the screen 201. That is, a failure with which the user U cannot deal has occurred, and thus "THERE IS A FAILURE." and "THERE IS A NECESSITY TO CONTACT THE SERVICE CENTER." are displayed.

In FIG. 14, when the characters "YES" displayed on the screen 201 is touched, the address, telephone number, fax number and other information of the service center are displayed on the screen 201. At this time, the local PC 600 in the service center is notified of the state of the air conditioner from the center PC 400.

Furthermore, when the displayed characters "YES" is touched in response to the characters "DO YOU WANT THE DETAILS OF REPAIR TO BE DISPLAYED?" displayed on the screen 201, the details of repair are displayed in the form of characters and images.

(Example Display of Installation Failure)

In FIG. 15, "VERTICAL FLAPS ARE NOT INSTALLED CORRECTLY. REMOVE AND REINSTALL THE FLAPS." is displayed on the screen 201. That is, there is provided information that, although the air conditioner is inoperable, it is in a state with which the user U can deal.

Then, when "YES" displayed is touched in response to "DO YOU WANT INSTALLATION PROCEDURES TO BE DISPLAYED?" displayed on the screen 201, ways for resolving the installation failure (a procedure of removing the flaps (see FIGS. 16 to 18) and a procedure of installing the flaps (see FIGS. 19 and 20)) are sequentially displayed on the screen 201 in the form of schematic diagrams and text or voice.

(Example Display for Resolving Installation Failure)

In FIG. 16, a way for turning a small back flap downward is displayed as a first step of removing the flaps.

In FIG. 17, a way for moving safety stoppers is displayed as a second step of removing the flaps.

In FIG. 18, a way for pulling out the small back flap first is displayed as a third step of removing the flaps, and also implementation of the first to third steps for the other flaps is displayed.

In FIG. 19, a way for inserting the flap is displayed as a first step of installing the flaps.

In FIG. 20, a way for securely inserting the safety stoppers is displayed as a second step of installing the flaps.

In FIG. 21, text providing information on what situation will occur if the flaps are not installed correctly is displayed together with a schematic diagram.

Hence, in the case where, although the air conditioner has not suffered a failure, it is inoperable, the user U can know the details of the situation, and also can deal with the situation quickly and easily, thereby enabling a quick resumption of operation.

It is noted that because there are various situations where, although the air conditioner has not suffered a failure, it becomes inoperable (for example, a situation where the filter 40 or the dust box 74 is not set in a correct position), the text are changed in accordance with each situation, and the displays indicating the ways for resolving an installation failure (for example, how to remove and install the filter 40 or how to remove and install the dust box 74) are also changed.

It is noted that "removable components" in the present invention is a generic term referring to components configured to be installable and removable by the user U, for example, the design panel 13, the vertical air flaps 16 and 17, the filter 40, and, in the case where the filter cleaning device 70 is included, the dust box 74, and refers to a whole into which the components are collected or each of the discrete components.

(Example Display for Resolving User's Doubt about Failure)

Incidentally, as described above, there are many cases where, although the air-conditioning apparatus seems to behave abnormally or be in an abnormal state since various behaviors or states that cause the user U to wonder, "Is it a failure?" in the air-conditioning apparatus are different from familiar behaviors or states, this is not a failure but a normal behavior or state. Furthermore, behaviors or states that cause many users U to wonder, "Is it a failure?" are centered on limited behaviors or states (which are not failures). That is, they correspond to frequently-asked questions. Thus, to resolve doubts or concerns about the above limited behaviors or states quickly and appropriately, the air-conditioning apparatus support system 1000 displays the following menu options on the screen 201 of the smartphone 200.

In the case where the user U feels, "Is it a failure?", and wants to resolve doubts or concerns about that, when "IS IT A FAILURE?" among the menu options displayed on the screen 201 of the smartphone 200 is touched first, the characters "DURING HEATING OPERATION", "DURING COOLING OPERATION", "OUTDOOR UNIT", and "INDOOR UNIT" (these are not illustrated) are then displayed.

FIG. 22 illustrates the case where the characters "DURING HEATING OPERATION" on the screen 201 is touched, "THE VERTICAL AIR FLAPS BECOME HORIZONTAL." is presented, and the state thereof is depicted in a schematic diagram.

Thus, in the case where the user U has doubts or concerns about this point, the doubts or concerns can be resolved by reading "THE VERTICAL AIR FLAPS BECOME HORIZONTAL AT THE START OF OPERATION, DURING DEFROSTING OPERATION, OR WHEN THE PRESET TEMPERATURE IS EXCEEDED. THIS IS NOT A FAILURE." written along with the above characters.

It is noted that, in the case where the vertical air flaps 16 and 17 are not actually horizontal, the characters "MORE INFORMATION" is displayed on the screen 201 since the doubts or concerns are not resolved in the display illustrated in FIG. 22.

Then, when the user U touches the characters "MORE INFORMATION", the next most frequent doubts and concerns with which the user U have in "DURING HEATING OPERATION" and their information, for example, "THE FILTER CLEANING MACHINE IS OPERATING BECAUSE HEATING OPERATION HAS BEEN PERFORMED CONTINUOUSLY FOR 50 HOURS. WAIT ABOUT FIVE MINUTES. THIS IS NOT A FAILURE." is displayed in the form of text and a schematic diagram (not illustrated).

The information to be displayed is pre-registered in the center PC 400 with the order of priority of the information to be displayed determined. Hence, information worth displaying is displayed in accordance with that order of priority.

FIG. 23 illustrates the case where the characters "OUTDOOR UNIT" displayed on the screen 201 is touched, an image representing the outdoor unit and the characters "WATER OR WHITE SMOKE COMES OUT." are displayed, and the state thereof is schematically displayed.

Thus, in the case where the user U has doubts or concerns about this point, the doubts or concerns can be resolved by reading the characters "WATER OR STEAM MAY COME OUT OF THE OUTDOOR UNIT DURING HEATING OPERATION. THIS IS NOT A FAILURE." displayed along with the above characters.

Furthermore, when the user U touches the characters "DO YOU REQUEST A SERVICE?" displayed on the screen 201, "THIS IS NOT A FAILURE, BUT IF YOU HAVE TROUBLE WITH THE WET, DO YOU REQUEST A CONSULTATION WITH THE SERVICE CENTER ABOUT DRAIN WORK?" is displayed. Then, when "YES" is touched, the information (the name, telephone number, and the like) about the service center (which may include a shop) is displayed, and the information is also transmitted from the center PC 400 to the local PC 600 in the service center (not illustrated).

It is noted that, in the case of a state in which water or steam can hardly come out of the outdoor unit actually (for example, the case where outdoor air humidity is very low during heating operation), the user U touches the characters "MORE INFORMATION" displayed on the screen 201 since the doubts or concerns are not resolved, and the next most frequent doubts and concerns and their information are displayed.

It is noted that, after the behaviors or states described above about which the user U feels doubts or concerns are understood and memorized by the user U, they do not have to be repeatedly displayed. Thus, the center PC 400 has a function of stopping display of information that does not have to be displayed for the air-conditioning apparatus 100 (identified by the GPS).

As described above, in the case where the user U wonders, "Is it a failure?" not for troubles, such as a failure and an installation failure, but for behaviors or states different from those familiar to the user U, the user U can know the cause with ease by touching the screen 201 of the smartphone 200, and thus doubts or concerns can be resolved quickly.

(Example Display of Instruction Manual)

As described above, on the screen 201 of the smartphone 200, the air-conditioning apparatus support system 1000 displays the details of a failure, the details of an installation failure, and ways of dealing with the failures, and also provides displays for resolving concerns about various behaviors or states that cause the user U to wonder, "Is it a failure?".

Furthermore, even in the case where there are no failure and the like or concerns, if there is certain "information that the user U wants to know", the user U can know the information described in the "instruction manual" or an "HP (website on the Internet)" with ease. Thus, in the case where the instruction manual has been lost, or the like, the user U can immediately check the desired information without work of accessing the HP and identifying the type of the air-conditioning apparatus, thereby increasing convenience.

That is, when the user U touches "INSTRUCTION MANUAL" displayed on the screen 201 of the smartphone 200, the content of the instruction manual is displayed from the center PC 400.

The invention claimed is:

1. An air-conditioning apparatus support system that supports an air-conditioning apparatus, comprising:
   a multifunctional mobile communication device connected to Internet that includes
      a global positioning system that detects a location of the multifunctional mobile communication device;
      an image capturing unit that captures an image of surroundings;
      a communication unit that communicates with a center computer connected to the Internet;
      a display unit that displays a character and an image; and a control unit configured to receive input of information of the location detected by the global positioning system and control the image capturing unit, the communication unit, and the display unit, wherein when the control unit of the multifunctional mobile communication device is activated at a location at which the air-conditioning apparatus is installed, in a case where the air-conditioning apparatus is not registered in the center computer, the control unit assumes the location detected by the global positioning system to be the location at which the air-conditioning apparatus is installed and causes the center computer to register the location, when the control unit is activated at the location at which the air-conditioning apparatus is installed, in a case where the air-conditioning apparatus is registered in the center computer, the control unit causes the display unit to display information about the air-conditioning apparatus, when a plurality of menu options for selecting information about the air-conditioning apparatus are displayed on the display unit and a specific menu option is selected from among the plurality of menu options, the control unit receives information about the specific menu option from the center computer and causes the display unit to display the information, and when a state-inquiry menu option for inquiring about a less-frequently occurring state that occurs during normal operation is prepared in the plurality of menu options and the state-inquiry menu option is selected, the control unit receives a character or image describing a state of the air-conditioning apparatus about the state-inquiry menu option from the center computer and causes the display unit to display the character or image.

2. The air-conditioning apparatus support system of claim 1, wherein the multifunctional mobile communication device includes an altimeter that detects a height that is a vertical location of the multifunctional mobile communication device, and wherein the control unit causes the center computer to register the location detected by the global positioning system and assumed to be the location at which the air-conditioning apparatus is installed, and also assumes the height detected by the altimeter to be a height at which the air-conditioning apparatus is installed and causes the center computer to register the height.

3. The air-conditioning apparatus support system of claim 1, wherein, in a case where a model of the air-conditioning apparatus is not identified, when the control unit is activated at the location at which the air-conditioning apparatus is installed, the control unit causes the display unit to display a display prompting taking an image of the air-conditioning apparatus or identification provided on the air-conditioning apparatus with the image capturing unit, assumes the location detected by the global positioning system to be the location at which the air-conditioning apparatus is installed, and causes the center computer to register the location, and also causes the center computer to register the model of the air-conditioning apparatus identified by using the image taken with the image capturing unit.

4. An air-conditioning apparatus support system that supports an air-conditioning apparatus, comprising
a multifunctional mobile communication device connected to Internet that includes
a global positioning system that detects a location of the multifunctional mobile communication device;
an image capturing unit that captures an image of surroundings;
a communication unit that communicates with a center computer connected to the Internet;
a display unit that displays a character and an image; and
a control unit configured to receive input of information of the location detected by the global positioning system and control the image capturing unit, the communication unit, and the display unit, wherein when the control unit of the multifunctional mobile communication device is activated at a location at which the air-conditioning apparatus is installed, in a case where the air-conditioning apparatus is not registered in the center computer, the control unit assumes the location detected by the global positioning system to be the location at which the air-conditioning apparatus is installed and causes the center computer to register the location, when the control unit is activated at the location at which the air-conditioning apparatus is installed, in a case where the air-conditioning apparatus is registered in the center computer, the control unit causes the display unit to display information about the air-conditioning apparatus, when a plurality of menu options for selecting information about the air-conditioning apparatus are displayed on the display unit and a specific menu option is selected from among the plurality of menu options, the control unit receives information about the specific menu option from the center computer and causes the display unit to display the information, a removable component is removably installed in the air-conditioning apparatus, and when a removal-inquiry menu option for inquiring about the removable component is prepared in the plurality of menu options and the removal-inquiry menu option is selected, the control unit causes the display unit to display a display prompting taking an image of the removable component with the image capturing unit, and causes the center computer to determine, by using the image taken with the image capturing unit, whether or not the removable component is installed in a correct position, and, in a case where it is determined that the removable component is not installed in the correct position, the control unit receives a name or schematic diagram of a part being not installed in a correct position from the center computer and causes the display unit to display the name or schematic diagram.

5. An air-conditioning apparatus support system that supports an air-conditioning apparatus, comprising:
a multifunctional mobile communication device connected to Internet that includes
a global positioning system that detects a location of the multifunctional mobile communication device;
an image capturing unit that captures an image of surroundings;
a communication unit that communicates with a center computer connected to the Internet;
a display unit that displays a character and an image; and
a control unit configured to receive input of information of the location detected by the global positioning system and control the image capturing unit, the communication unit, and the display unit, wherein when the control unit of the multifunctional mobile communication device is activated at a location at which the air-conditioning apparatus is installed, in a case where the air-conditioning apparatus is not registered in the center computer, the control unit assumes the location detected by the global positioning system to be the location at which the air-conditioning apparatus is installed and causes the center computer to register the location, when the control unit is activated at the location at which the air-conditioning apparatus is installed, in a case where the air-conditioning apparatus is registered in the center computer, the control unit causes the display unit to display information about the air-conditioning apparatus, when a plurality of menu options for selecting information about the air-conditioning apparatus are displayed on the display unit and a specific menu option is selected from among the plurality of menu options, the control unit receives information about the specific menu option from the center computer and causes the display unit to display the information, a removable component is removably installed in the air-conditioning apparatus, and when a removal-inquiry menu option for inquiring about the removable component is prepared in the plurality of menu options and the removal-inquiry menu option is selected, the control unit causes the display unit to display a display prompt, and causes the center computer to determine whether or not the removable component is installed in a correct position, and, in a case where it is determined that the removable component is not installed in the correct position, the control unit receives a name or schematic diagram of a part being not installed in a correct position from the center computer and causes the display unit to display the name or schematic diagram.

6. The air-conditioning apparatus support system of claim 1, wherein
the display prompt of the display unit is a display prompting taking an image of the removable component with the image capturing unit.

7. The air-conditioning apparatus support system of claim 1, wherein
the less-frequently occurring state means a predetermined state of the air-conditioning apparatus that is a normal operational state and not a failure of the air-conditioning apparatus and that is predetermined to appear as a failure or an installation failure of the air-conditioning apparatus to a user.

8. The air-conditioning apparatus support system of claim 1, wherein
the less-frequently occurring state means an operational state of the air-conditioning apparatus that is predetermined to appear as an operational failure or an installation failure of the air-conditioning apparatus to a user and that is a predetermined operational state that occurs in normal operation of the air-conditioning apparatus.

9. The air-conditioning apparatus support system of claim 1, wherein
the less-frequently occurring state that occurs during normal operation is not a failure or an error in an operation or installation of the air-conditioning apparatus.

10. The air-conditioning apparatus support system of claim 1, wherein
the less-frequently occurring state is a predetermined operational state of the air-conditioning apparatus that occurs during normal operation and that is not a failure or an error in an operation of the air-conditioning unit apparatus.

11. The air-conditioning apparatus support system of claim 1, wherein
the less-frequently occurring state is one or more operational states of the air-conditioning apparatus predetermined to cause a user to think that the less-frequently occurring state is a failure or an error in the operation or installation of the air-conditioning unit apparatus.

12. The air-conditioning apparatus support system of claim 1, wherein
the less-frequently occurring state is a maintenance operation of the air conditioning apparatus that is predetermined to appear as an operation failure or an installation failure of the air-conditioning apparatus to a user.

13. The air-conditioning apparatus support system of claim 1, wherein
the less-frequently occurring state is an operational state in which white smoke or water comes out of the outdoor unit and an operational state in which vertical air flaps shift into a horizontal position.

14. The air-conditioning apparatus support system of claim 11, wherein
the less-frequently occurring state is an operational state in which white smoke or water comes out of the outdoor unit and an operational state in which vertical air flaps shift into a horizontal position.

* * * * *